(12) United States Patent
Marszalek

(10) Patent No.: US 7,322,632 B1
(45) Date of Patent: Jan. 29, 2008

(54) VEHICLE VISOR ASSEMBLY

(76) Inventor: Jack F. Marszalek, 34656 Roadrunner, P.O. Box 1607, Black Canyon City, AZ (US) 85324

(*) Notice: Subject to any disclaimer, the term of this patent is extended or adjusted under 35 U.S.C. 154(b) by 0 days.

(21) Appl. No.: 11/504,439

(22) Filed: Aug. 15, 2006

Related U.S. Application Data

(60) Provisional application No. 60/711,889, filed on Aug. 26, 2005.

(51) Int. Cl.
B60J 3/00 (2006.01)

(52) U.S. Cl. .................................. 296/97.7; 296/97.8

(58) Field of Classification Search ............ 296/97.7, 296/97.2, 97.9, 97.8, 97.6, 97.1, 97.11
See application file for complete search history.

(56) References Cited

U.S. PATENT DOCUMENTS

| 1,929,314 | A | * | 10/1933 | Ishii | 296/97.7 |
|---|---|---|---|---|---|
| 2,423,322 | A | * | 7/1947 | Hurley, Jr. | 296/96.19 |
| 2,501,250 | A | * | 3/1950 | Wilson | 296/97.7 |
| 2,546,495 | A | * | 3/1951 | Bybee | 296/97.7 |
| 2,604,807 | A | * | 7/1952 | Woodburn | 296/84.1 |
| 2,715,043 | A | * | 8/1955 | Schewel | 296/97.7 |
| 2,813,749 | A | * | 11/1957 | Wetig | 296/97.7 |
| 2,863,697 | A | * | 12/1958 | Watkins | 296/97.1 |
| 4,065,171 | A | * | 12/1977 | Nagy | 296/97.7 |
| 4,762,358 | A | * | 8/1988 | Levosky et al. | 296/97.7 |
| 4,861,090 | A | * | 8/1989 | Gavrieli | 160/134 |
| 4,872,721 | A | * | 10/1989 | Sniadach | 296/97.2 |
| 5,040,841 | A | * | 8/1991 | Yang | 296/97.6 |
| 5,044,685 | A | * | 9/1991 | Yang | 296/97.6 |
| 5,283,683 | A | * | 2/1994 | Yamamoto | 296/97.8 |
| 5,641,191 | A | * | 6/1997 | Jia | 296/97.6 |
| D431,805 | S | * | 10/2000 | Baltazar | D12/191 |
| 2002/0171256 | A1 | * | 11/2002 | Ward | 296/97.7 |

* cited by examiner

Primary Examiner—Kiran B. Patel
(74) Attorney, Agent, or Firm—Parsons & Goltry; Michael W. Goltry; Robert A. Parsons

(57) ABSTRACT

In a vehicle including a cab, having a windshield with opposed upper and lower edges, bounding an interior, a dashboard extending into the interior proximate the lower edge of the windshield, a hood extending forwardly of the cab proximate the lower edge of the windshield, a sitting position in the interior of the vehicle rearward of the dashboard, and a field of view to the hood through the windshield overlying the dashboard from the sitting position, improvements therein consisting of a visor, having a glare suppressing property, mounted in the field of view adjacent to the lower edge of the windshield and the dashboard suppressing glare from the hood in the field of view.

9 Claims, 7 Drawing Sheets

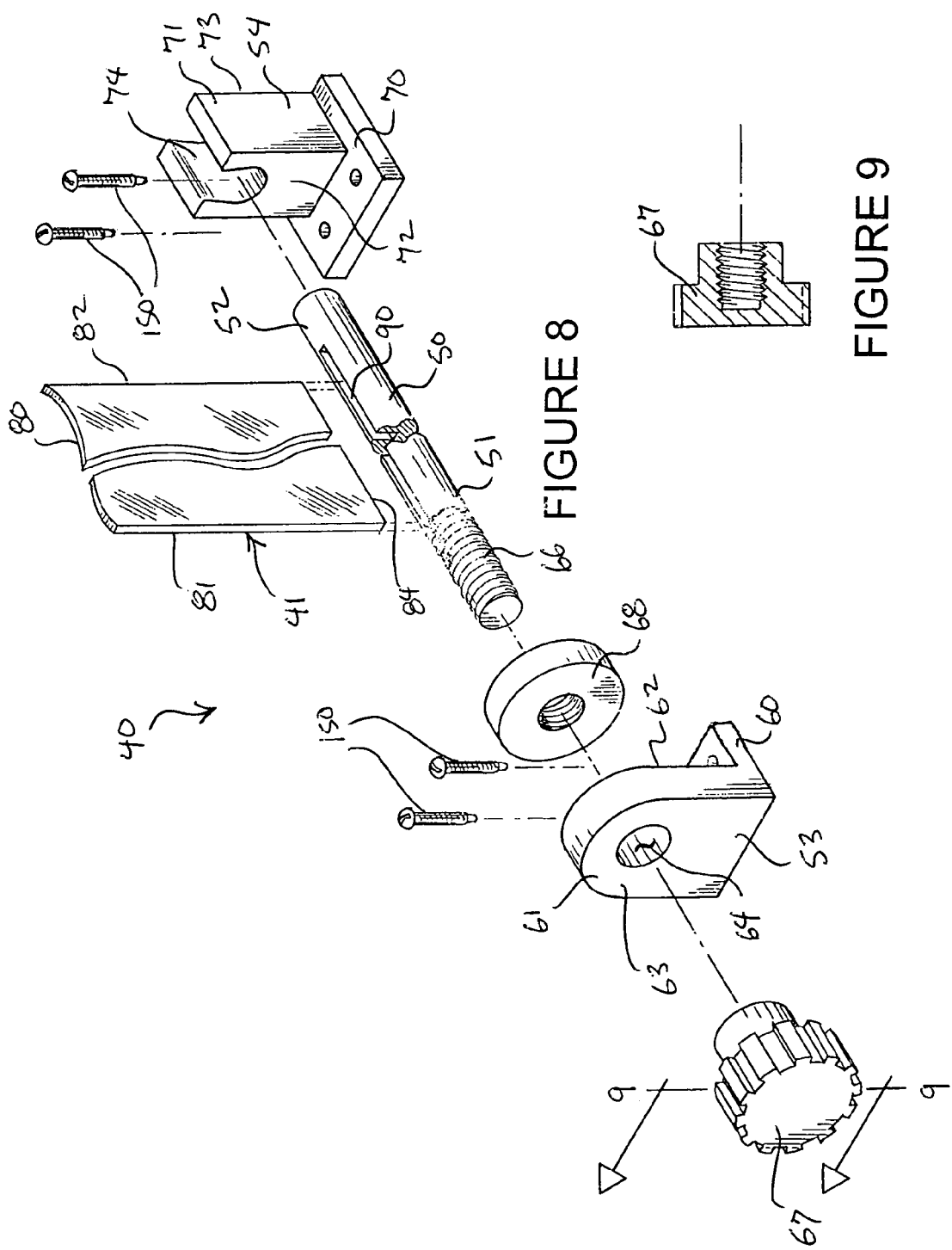

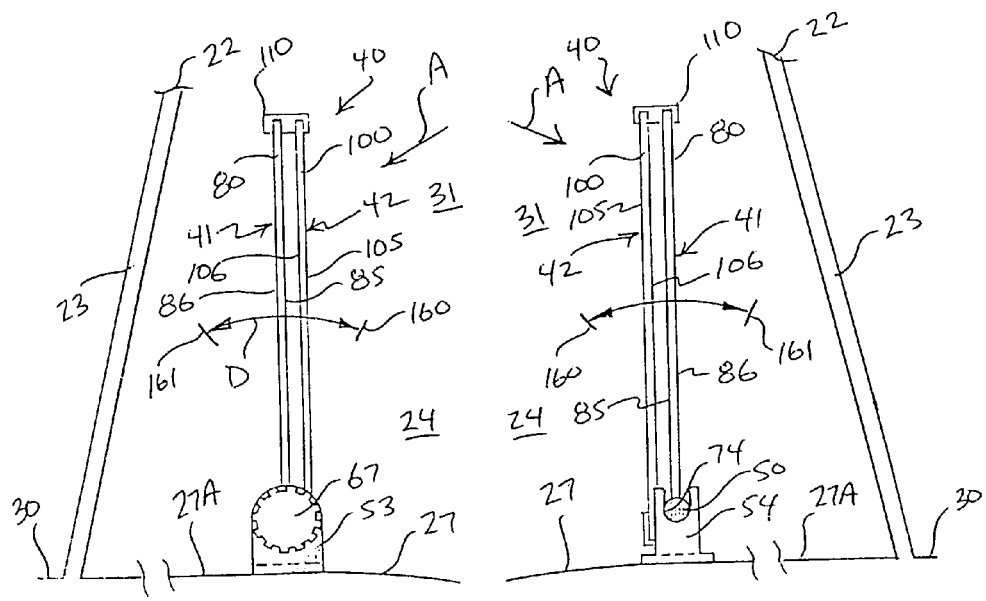
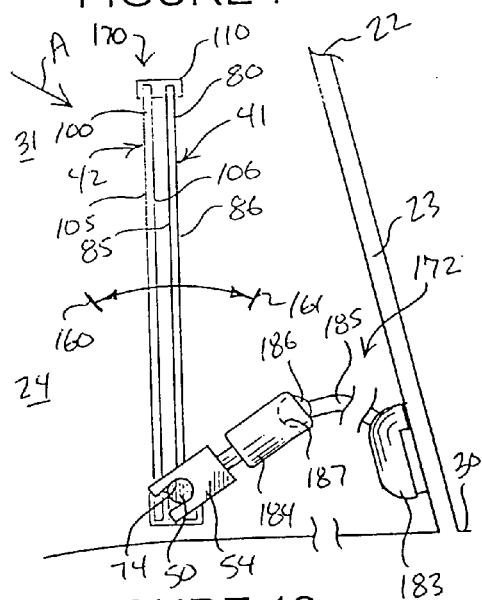
FIGURE 6   FIGURE 7
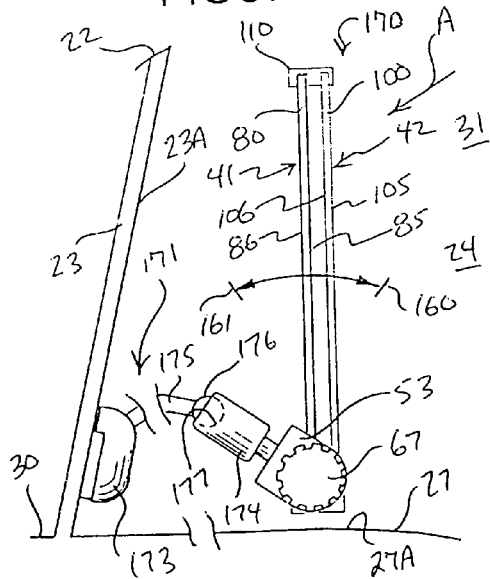
FIGURE 11   FIGURE 12

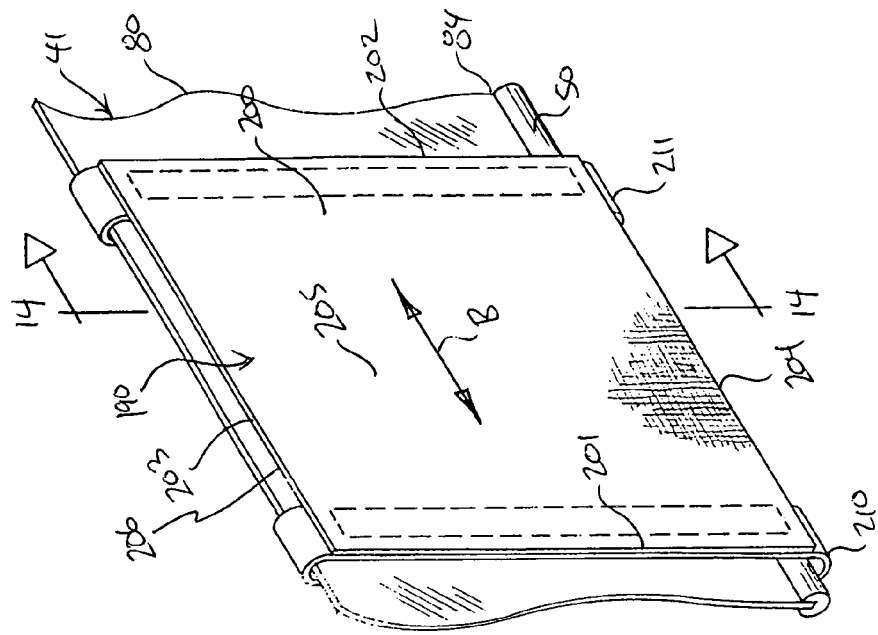
FIGURE 14
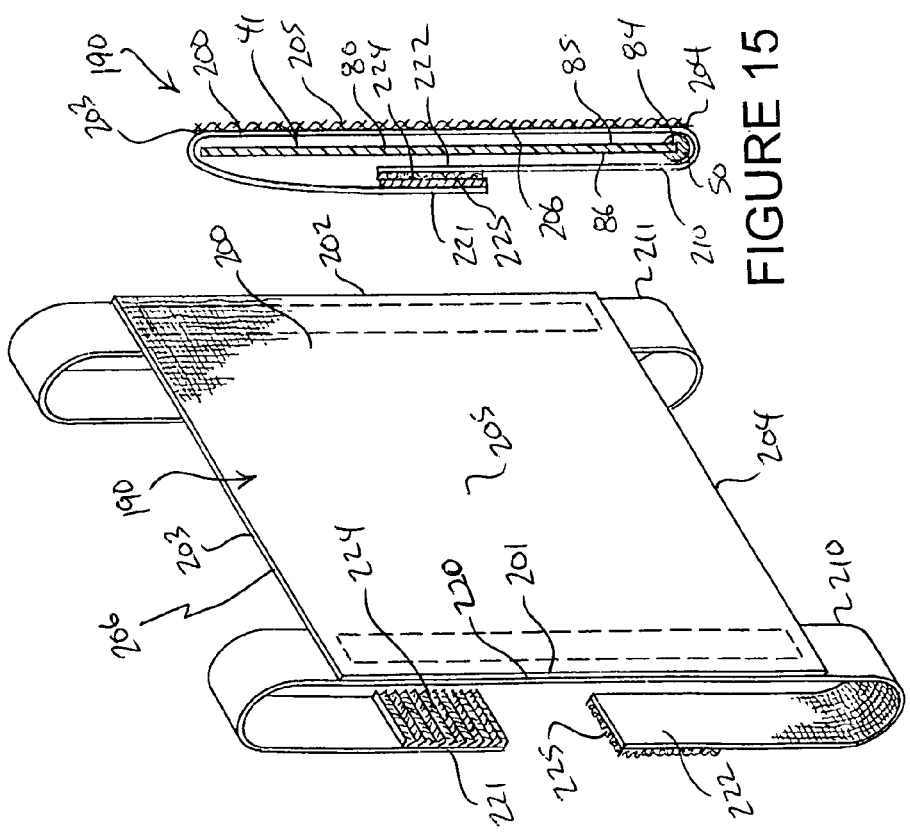
FIGURE 15
FIGURE 13

VEHICLE VISOR ASSEMBLY

CROSS REFERENCE TO RELATED APPLICATION

This application claims the benefit of U.S. Provisional Application No. 60/711,889, filed Aug. 26, 2005.

FIELD OF THE INVENTION

The present invention relates to apparatus and methods for reducing glare and light along a field of view and, more particularly, to a vehicle visor for reducing glare along a field of view from within a vehicle through the windshield of the vehicle.

BACKGROUND OF THE INVENTION

Teaching people to drive a vehicle should not be limited only to good weather, because normal driving usually involves exposure to a variety of weather conditions, including rain, ice and snow, fog, and glare. Glare is usually worse in the early morning, late in the afternoon, and early in the evening. Low sun angles are a short-time problem, and some drivers adjust their travel schedules to avoid driving during peak glare hours. Wearing sunglasses and knowing how to utilize the overhead visors common to most vehicles can significantly reduce the adverse impact of glare caused by sunlight.

Overhead visors are incorporated into most vehicles, and are obviously useful for blocking or reducing glare. However, a primary source of glare is sunlight reflecting off the hood of a vehicle. Because conventional overhead visors are located at the top of the windshield, they are entirely ineffective for blocking or reducing glare reflecting upwardly from the hood into a user's field of view through the windshield. Although skilled artisans have devoted considerable effort toward overhead visors for reducing glare produced by sunlight, little effort has been devoted toward ways to reduce glare caused by sunlight reflecting off the hood of a vehicle.

SUMMARY OF THE INVENTION

In a vehicle including a cab, having a windshield with opposed upper and lower edges, bounding an interior, a dashboard extending into the interior proximate the lower edge of the windshield, a hood extending forwardly of the cab proximate the lower edge of the windshield, a sitting position in the interior of the vehicle rearward of the dashboard, and a field of view to the hood through the windshield overlying the dashboard from the sitting position, improvements therein according to the principle of the invention including a visor, having a glare suppressing property, mounted in the field of view adjacent to the lower edge of the windshield and the dashboard suppressing glare from the hood in the field of view. The visor is further mounted for movement in reciprocal directions across the field of view, thereby providing adjustment of the visor across the field of view for locating the visor where needed to suppress the glare from the hood in the field of view as the direction of the glare in the field of view changes. The visor is still further mounted for pivotal movement between a first position away from the windshield toward the sitting position and a second position toward the windshield away from the sitting position, thereby providing adjustment of the visor relative to the field of view for locating the visor where needed to suppress the glare from the hood in the field of view as the angle of the glare in the field of view changes. In one embodiment, the visor is carried by a support attached to the dashboard. In another embodiment, the visor is carried by a support attached to the windshield. Preferably, the glare suppressing property of the visor is a glare blocking property. In another embodiment, the glare suppressing property of the visor is a glare reducing property.

In a vehicle including a cab, having a windshield with opposed upper and lower edges, bounding an interior, a dashboard extending into the interior proximate the lower edge of the windshield, a hood extending forwardly of the cab proximate the lower edge of the windshield, a sitting position in the interior of the vehicle rearward of the dashboard, and a field of view to the hood through the windshield overlying the dashboard from the sitting position, improvements therein according to the principle of invention include a support mounted to the vehicle in the interior of the cab, and a visor, having a glare suppressing property, carried by the support, the visor disposed in the field of view adjacent to the lower edge of the windshield and the dashboard suppressing glare from the hood in the field of view. The visor is further mounted to the support for movement in reciprocal directions across the field of view, thereby providing adjustment of the visor across the field of view for locating the visor where needed to suppress the glare from the hood in the field of view as the direction of the glare in the field of view changes. The support is movable in pivotal directions between a first position disposing the visor away from the windshield toward the sitting position and a second position disposing the visor toward windshield away from the sitting position, thereby providing adjustment of the visor relative to the field of view for locating the visor where needed to suppress the glare from the hood in the field of view as the angle of the glare in the field of view changes. In one embodiment, the support is attached to the dashboard. In another embodiment, the support is attached to the windshield. Preferably, the glare suppressing property of the visor is a glare blocking property. In another embodiment, the glare suppressing property of the visor is a glare reducing property.

In a vehicle including a cab, having a windshield with opposed upper and lower edges, bounding an interior, a dashboard extending into the interior proximate the lower edge of the windshield, a hood extending forwardly of the cab proximate the lower edge of the windshield, a sitting position in the interior of the vehicle rearward of the dashboard, and a field of view to the hood through the windshield overlying the dashboard from the sitting position, improvements therein according to the principle of the invention include a support, including an elongate, upstanding sheet of transparent material, disposed in the interior of the cab, the sheet of transparent material disposed in, and extending across, the field of view adjacent to the lower edge of the windshield and the dashboard and having opposed upper and lower edges, opposed side edges, and opposed first and second major faces. A visor, having a glare suppressing property, is coupled to the support. The visor is disposed between the opposed side edges of the sheet of transparent material overlying and extending across the first major face substantially from the lower edge thereof to the upper edge thereof. The visor is disposed in the field of view adjacent to the lower edge of the windshield and the dashboard suppressing glare from the hood in the field of view. The support visor is further mounted to the support for movement in reciprocal directions relative to the sheet of transparent material between a first position adjacent to the first side edge of the sheet of transparent material and a second position adjacent to the second side edge of the sheet of transparent material, thereby providing adjustment of the visor across the field of view for locating the visor where needed to suppress the glare from the hood in the field of view as the direction of the glare in the field of view changes. The support is further mounted for movement in pivotal directions between a first position disposing the visor away from the windshield toward the sitting position and a second position disposing the visor toward windshield away from the sitting position, thereby providing adjustment of the visor relative to the field of view for locating the visor where needed to suppress the glare from the hood in the field of view as the angle of the glare in the field of view changes. In one embodiment, the support is mounted to the dashboard. In another embodiment, the support is mounted to the windshield. A retention member interacts between the visor and the support frictionally retaining the visor to the support. Preferably, the retention member consists of a spring captured by, and interacting between, the visor and the support. Preferably, the glare suppressing property of the visor is a glare blocking property. In another embodiment, the glare suppressing property of the visor is a glare reducing property.

Consistent with the foregoing summary of preferred embodiments, and the ensuing detailed description, which are to be taken together, the invention also contemplates associated embodiments.

BRIEF DESCRIPTION OF THE DRAWINGS

Referring to the drawings:

FIG. 6 is a left side elevational view of the visor assembly of FIG. 1;

FIG. 7 is a right side elevational view of the visor assembly of FIG. 1;

FIG. 8 is an exploded perspective view of the visor assembly of FIG. 1;

FIG. 9 is a sectional view taken along line 9-9 of FIG. 8;

FIG. 11 is a left side elevational view of an alternate embodiment of a visor assembly constructed and arranged in accordance with the principle of the invention;

FIG. 12 is a right side elevational view of the visor assembly of FIG. 11;

FIG. 13 is a perspective view of a visor for use in conjunction with the visor assembly of FIG. 1;

FIG. 14 is a perspective view of the visor of FIG. 13 shown as it would appear attached to the support of the support of the visor assembly of FIG. 1; and FIG. 15 is a sectional view taken along line 15-15 of FIG. 14.

DETAILED DESCRIPTION OF PREFERRED EMBODIMENTS

Figure 1:
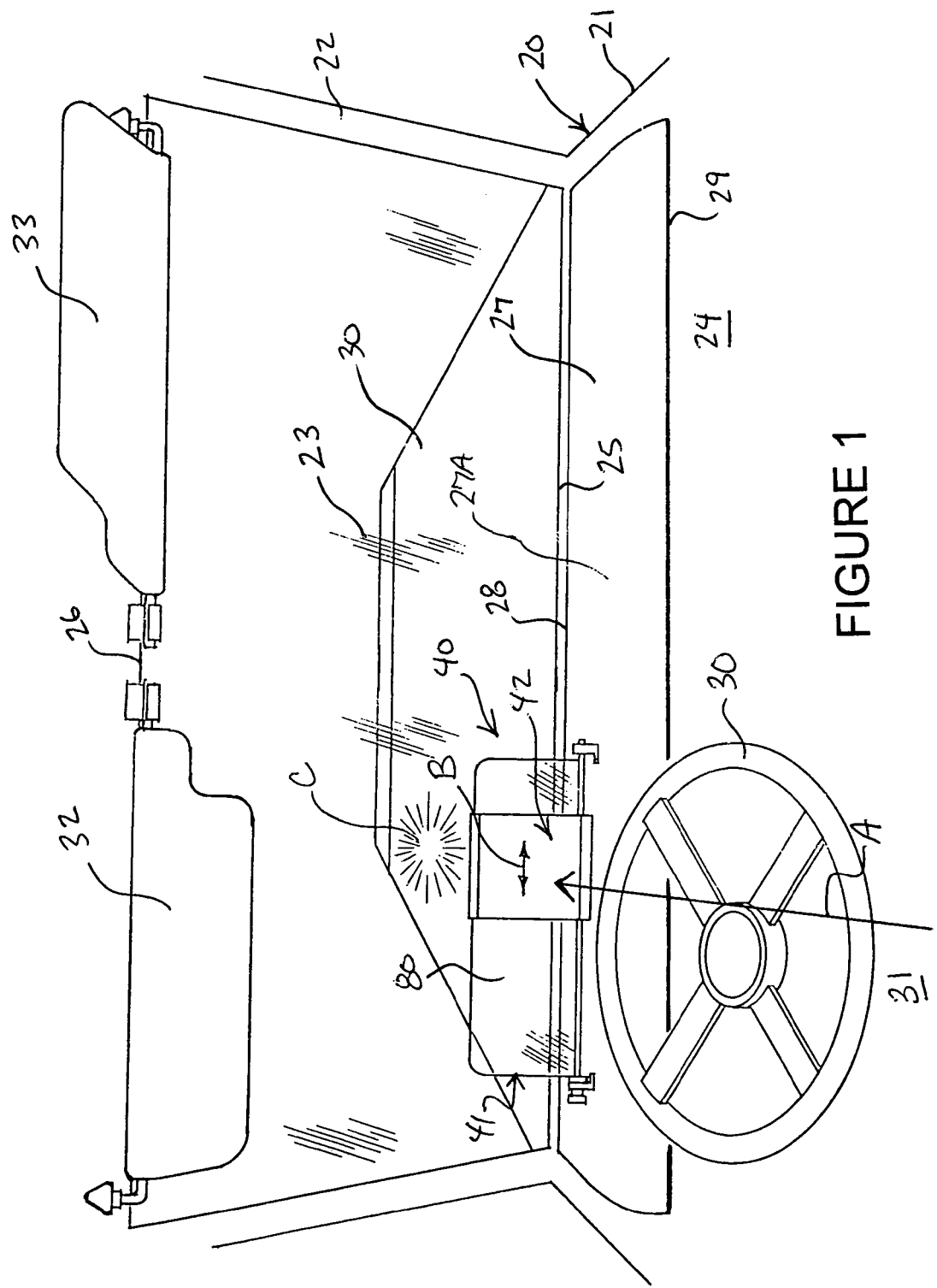
FIG. 1 is a perspective view of a vehicle including a cab, having a windshield, bounding an interior, a dashboard extending into the interior, a hood extending forwardly of the cab from the windshield, a sitting position in the interior of the vehicle rearward of the dashboard, a field of view to the hood through the windshield overlying the dashboard from the sitting position, and a visor assembly, constructed and arranged in accordance with the principle of the invention, mounted in the field of view suppressing glare from the hood in the field of view.

Turning now to the drawings, in which like reference characters indicate corresponding elements throughout the several views, attention is first directed to FIG. 1 in which there is seen a vehicle 20 including a wheeled vehicle body 21 formed with a cab 22, having a windshield 23, bounding a passenger compartment or interior 24. Windshield 23 has opposed lower and upper edges 25 and 26. A dashboard 27 extends into interior 24 proximate lower edge 25 of windshield 23. Windshield 23 extends upright from dashboard 27 to upper edge 26. Dashboard 27 has a forward edge 28 located adjacent to lower edge 25 of windshield 23, an opposed rearward edge 29 extending into interior toward a steering wheel 30 disposed in interior 24 for use by an operator in driving vehicle 20, and an upper surface 27A therebetween. Body 21 is also formed with a hood 30, which extends forwardly of cab 22 proximate lower edge 25 of windshield 23. Hood 30 forms part of the engine compartment of vehicle 20, which provides vehicle 20 with motorized mobility. A sitting position 31 in interior 24 of cab 22 is located rearward of steering wheel 30 and dashboard 24, and there is a field of view designated generally by the arrowed line A to hood 30 through windshield overlying dashboard 27 from sitting position 31. Opposed left-side and right-side conventional overhead visors 32 and 33 are mounted to cab 22 proximate upper edge 26 of windshield, and are used to shield sunlight from passengers in interior 24 of cab 22. Because sitting position 31 is behind steering wheel 30, field of view A is the driver's side field of view, namely, the field of view of a driver sitting in sitting position 31 in the operation of vehicle 20.

Set forth for the purpose of orientation and reference in connection with the ensuing detailed description of preferred embodiments of the invention, the foregoing brief description of vehicle 20 is intended to be generally representative of a typical transport or passenger vehicle, such as a car, truck, bus, or the like. Details not specifically illustrated and described will be readily understood and appreciated by those skilled in the art.

Figure 2:
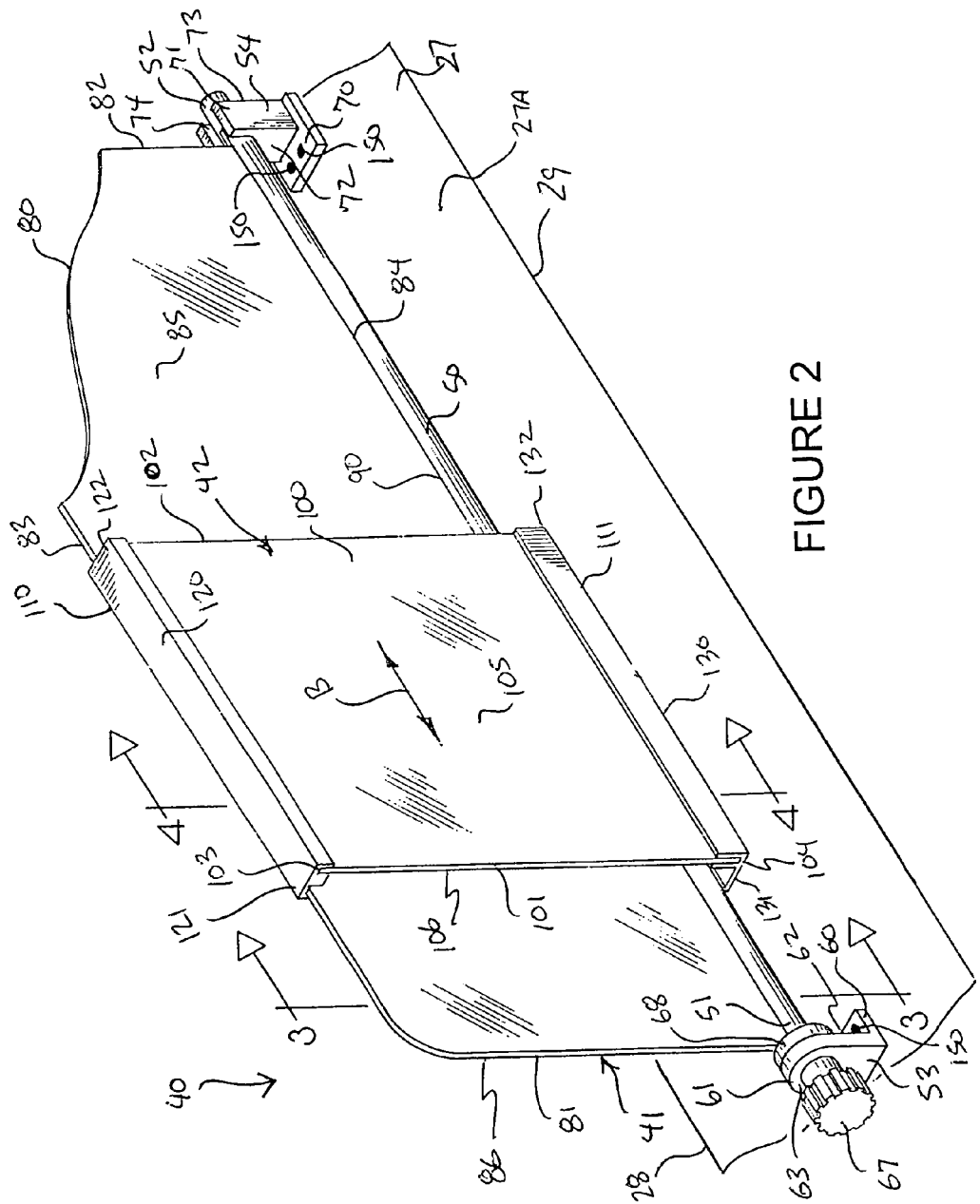
FIG. 2 is a fragmented perspective view of the visor assembly of FIG. 1.

According to the principle of the invention, vehicle 20 is furnished with improvements constructed and arranged in accordance with the principle of the invention, namely, a visor assembly 40 mounted in field of view A adjacent to lower edge 25 of windshield 23 and dashboard 27 suppressing glare from hood 30 reflecting upwardly therefrom in field of view A, which may otherwise impair a driver in sitting position 31 from safely operating vehicle 20. Referring to FIG. 2, visor assembly 40 consists of a support 41 and a glare-suppressing visor 42. Visor assembly 40 is disclosed in conjunction with the driver side sitting position 31, although it may be utilized in conjunction with the passenger side sitting position if so desired.

Support 41 supports or otherwise carries visor 42. Support 41 consists of a rigid, elongate rod 50 having opposed inner and outer ends 51 and 52. Inner end 51 of rod 50 is held by bracket 53, outer end 52 of rod 50 is held by bracket 54, and in this embodiment brackets 53 and 54 are affixed to upper surface 27A of dashboard 27 between forward and rearward edges 28 and 29 thereof thereby locating visor assembly 40 in field of view A adjacent to lower edge 25 of windshield 23 and dashboard 27 for permitting visor 42 to suppress glare from hood 30 in field of view A, according to the principle of the invention. Rod 50 has a length extending from inner end 51 to outer end 52, and is capable of rotating or otherwise pivoting relative to brackets 53 and 54, and is fashioned of plastic, wood, metal, or other selected rigid material or combination of rigid materials, as are brackets 53 and 54.

Looking to FIG. 8, bracket 53 consists of an upstanding, integrated, rigid body having a lower end 60, an opposing upper end 61, an inner side 62, an opposing outer side 63, and an opening 64 extending through upper end 61 from inner side 62 to outer side 63. Inner end 51 of rod 50 is formed with a threaded length or portion 66, which extends through opening 64 formed in upper end 61 of bracket 53, whereby a length of threaded portion 66 extends inwardly away from inner side 62 and a length of threaded portion 66 extends outwardly away from outer side 63. A knob 67 opposing outer side 63 of bracket 53 is threaded onto threaded portion 66, and a washer 68 opposing inner side 62 of bracket 53 is threaded onto threaded portion 66. Knob 67 and washer 68 are concurrently tightened against outer and inner sides 63 and 62, respectively, of bracket 53 thereby frictionally securing/gripping inner end 51 of rod 50 to bracket 53, and yet allowing a user to rotate/pivot rod 50 relative to brackets 53 and 54 by applying a force to knob 67, such as by hand, sufficient to overcome the frictional securement provided by knob 67 and washer 68. Threaded portion 66 consists of external threads, and knob 67 and washer 68 are each internally threaded. FIG. 9 is a sectional view taken along line 9-9 of FIG. 8 illustration the internal threads formed in knob 67. Rod 50 may be pivoted/rotated relative to brackets 53 and 54 by exerting a force upon rod 50, such as at knob 67, sufficient to overcome the frictional securement of rod 50 to bracket 53 by knob 67 and washer 68, or by loosening knob 67, rotating rod 50, and then retightening knob 67 to secure rod 50 in the adjusted position.

Bracket 54 consists of an upstanding, integrated, rigid body having a lower end 70, an opposing upper end 71, an inner side 72, and an opposing outer side 73. A notch or channel 74 is formed in upper end 71, which extends longitudinally from inner side 72 to outer side 73 and which accepts and retains outer end 52 of rod 50. Preferably, the opening into channel 74 is narrowed somewhat relative to outer end 52 of rod 50, whereby outer end 52 of rod 50 is essentially snap-received in, and retained by, channel 74.

Looking back to FIG. 2, support 41 further incorporates a sheet 80 of transparent material including opposed, upstanding, parallel side edges 81 and 82, opposed, longitudinal, parallel upper and lower edges 83 and 84, and opposed major faces 85 and 86. Side edges 81 and 82 and upper and lower edges 83 and 84 cooperate together forming a perimeter edge of sheet 80. Sheet 80 is fashioned of substantially rigid, transparent material, such as transparent plastic, glass, plexiglass, polycarbonate resin thermoplastic offered under the LEXAN brand, high index lens material, or other substantially rigid, transparent material or combination of materials through which objects can be readily and easily seen. In the present and preferred embodiment, sheet 80 is rectangular in shape having a length extending from side edge 81 to side edge 82, and a height extending from upper edge 83 to lower edge 84, in which the length of sheet 80 is greater substantially than the height of sheet 80.

Figure 3:
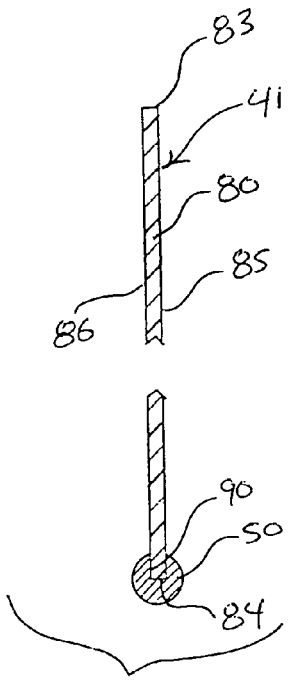
FIG. 3 is a sectional view taken along line 3-3 of FIG. 2.
Figure 4:
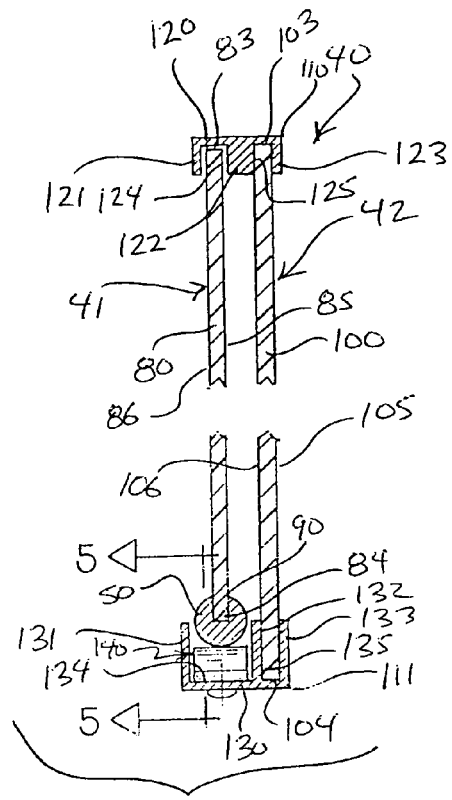
FIG. 4 is a sectional view taken along line 4-4 of FIG. 2.

Referring to FIG. 8, an elongate groove 90 is formed in rod 50. Groove 90 extends along substantially the entire length of rod 50 from threaded portion 66 to outer end 52, which, as illustrated in FIGS. 3 and 4, accepts lower edge 84 of sheet 80. The length of sheet 80 from side edge 81 to side edge 82 is substantially equal in length to groove 90. The receipt of lower edge 84 of sheet 80 in groove 90 is a tongue-and-groove joint, which secures lower edge 84 of sheet 80 to rod 50. Lower edge 84 of sheet 80 is preferably rigidly affixed in groove 90. In the preferred embodiment disclosed herein, adhesive is introduced between lower edge 84 of sheet 80 and groove 90 for adhesively adhering lower edge 84 to groove 90. Pins, screws, or other forms of mechanical fasteners can be used to secure lower edge 84 of sheet 80 in groove 90 of rod 50, if desired. Sheet 80 extends upright from rod 50 to upper edge 83. Although sheet 80 is formed with the tongue element of the tongue-and-groove joint used to secure sheet 80 to rod 50, and rod 50 is formed with the corresponding groove 90 of the tongue-and-groove attachment joint, this can be reversed. Those having ordinary skill in the art will readily appreciate that rod 50 and sheet 80 may be integrally formed, welded together, or formed in other ways.

Looking back to FIG. 2, visor 42 is carried by support 41. In this preferred embodiment, visor 42 overlies major face 85 of sheet 80, is located between opposed side edges 81 and 82 of sheet 80, and extends across major face of sheet 80 substantially from lower edge 84 thereof at rod 50 to upper edge 83 thereof. Visor 42 consists of a sheet 100 of material including opposed, upstanding, parallel side edges 101 and 102, opposed, longitudinal, parallel upper and lower edges 103 and 104, and opposed major faces 105 and 106. Side edges 101 and 102 and upper and lower edges 103 and 104 cooperate together forming a perimeter edge of sheet 100. In the immediate embodiment, sheet 100 is square in shape having a length extending from side edge 101 to side edge 102, and a height extending from upper edge 103 to lower edge 104, in which the length of sheet 100 is substantially equal to the height of sheet 100. The length of sheet 100 is substantially smaller than the length of sheet 80. In the preferred embodiment set forth herein, the length of sheet is only about approximately 25% of the length of sheet 80, although this is set forth only as a matter of example in conjunction with the preferred embodiment set forth herein with the understanding that sheet 100 can be somewhat less than 25% of the length of sheet 80 or somewhat greater than 25% of the length of sheet 80.

Sheet 100 forming part of visor 42 has a glare suppressing property allowing it to suppress glare from hood 30 in field of view A experienced by the driver of vehicle 20 sitting in sitting position 31. Because visor 42 has a glare suppressing quality, it is fashioned of a glare suppressing material or combination of glare suppressing materials. Such glare-suppressing materials include in one embodiment, materials that reduce glare, and, in another embodiment, materials that block glare. Materials that reduce glare include low light transmission glass, plastic, polycarbonate, or other like materials having the property of low-transmission or otherwise low light transmission. Materials that block glare include materials that substantially lack the ability to transmit light, such as wood, metal, non-transparent plastic, cardboard, and other like materials having the property of substantially no light transmission or otherwise no transmission. And so it is to be understood that in one embodiment, the glare suppressing property of visor 42 is a glare reducing property, and that in another embodiment the glare suppressing property of visor 42 is a glare blocking property.

Visor assembly 40 incorporates opposed sliders 110 and 111, which secure visor 42 to support 41, in accordance with the principle of the invention. Sliders 110 and 111 can be considered part of visor 42. When sheet 100 is mounted to support 41 according to the principle of the invention, side edge 101 is directed toward side edge 81 of sheet 80, side edge 102 is directed toward side edge 82 of sheet 80, upper edge 103 is located proximate upper edge 83 of sheet 80, lower edge 104 is located proximate lower edge 84 of sheet 80, major edge 105 is directed outwardly away from major face 85 of sheet 80, and major face 106 faces and confronts major face 85 of sheet 80.

As seen in FIG. 4, sliders 110 and 111 hold sheet 100 away from major face 85 of sheet 80 of support 41. Sheet 100 is secured by sliders 110 and 111, so as to be disposed alongside and overlying or otherwise confronting major face 85 of sheet 80 and held away from major face 85 of sheet 80. Sliders 110 and 111 not only secure sheet 100 to support 41, but also are slidably mounted to support 41 allowing visor 42, and thus sheet 100, to be moved in reciprocal directions relative to support 41 as generally indicated by the double arrowed line B in FIGS. 1 and 2 from and between side edge 81 of sheet 80 to side edge 82 of sheet 80, in accordance with the principle of the invention. Because sliders 110 and 111 hold sheet 100 away from major face 85 of sheet 80 of support 41, sliders 110 and 111 prevent sheet 100 from contacting or otherwise interacting with major face 85 of sheet 80 thereby preventing sheet 100 from scratching major face 85 in response to movement of sheet 100 relative to sheet 80.

Referring back to FIG. 2, slider 110 is concurrently coupled to upper edge 83 of sheet 80 of support 41 and upper edge 103 of sheet 100, and slider 111 is concurrently coupled to rod 50 of support 41 and lower edge 104 of sheet 100. Sheet 100 is rigidly secured to sliders 110 and 111, and sliders 110 and 111 are slidably mounted to support 41.

Slider 110 consists of an elongate, substantially rigid body 120 having opposed ends 121 and 122, and a length extending from end 121 to end 122 that, in this preferred embodiment, is substantially equal to the length of sheet 100, although it may be lesser or greater in length relative to the length of sheet 100. Spaced-apart proximal, intermediate, and distal endwalls 121, 122, and 123, respectively, depend downwardly from body 120. Proximal and intermediate endwalls 121 and 122 define a socket 124 therebetween, and intermediate and distal endwalls 122 and 123 define a socket 125 therebetween. Upper edge 83 of sheet 80 is received and held in socket 124, and upper edge 103 of sheet 100 is received and held in socket 125. Upper edge 83 of sheet 80 can slide relative to socket 124, and upper edge 103 is rigidly affixed in socket 125. In the preferred embodiment disclosed herein, adhesive is introduced between upper edge 103 of sheet 100 and socket 125 for adhesively adhering upper edge 103 to socket 125. Pins, screws, or other forms of mechanical fasteners can be used to secure upper edge 103 of sheet 100 in socket 125 of slider 110, if desired.

Looking back to FIG. 2, slider 111 consists of an elongate, substantially rigid body 130 having opposed ends 131 and 132, and a length extending from end 131 to end 132 that is substantially equal to the length of sheet 100, although it may be lesser or greater in length relative to the length of sheet 100. As illustrated in FIG. 4, spaced-apart proximal, intermediate, and distal endwalls 131, 132, and 133, respectively, depend upwardly from body 130. Proximal and intermediate endwalls 131 and 132 define a socket 134 therebetween, intermediate and distal endwalls 132 and 133 define a socket 135 therebetween. Rod 50 is received and maintained in socket 134, and lower edge 104 of sheet 100 is received and held in socket 135. Rod 50 can slide relative to socket 134, and lower edge 104 is rigidly affixed in socket 135. In the preferred embodiment disclosed herein, adhesive is introduced between lower edge 104 of sheet 100 and socket 135 for adhesively adhering lower edge 104 to socket 135. Pins, screws, or other forms of mechanical fasteners can be used to secure lower edge 104 of sheet 100 in socket 135 of slider 111, if desired.

Figure 5:
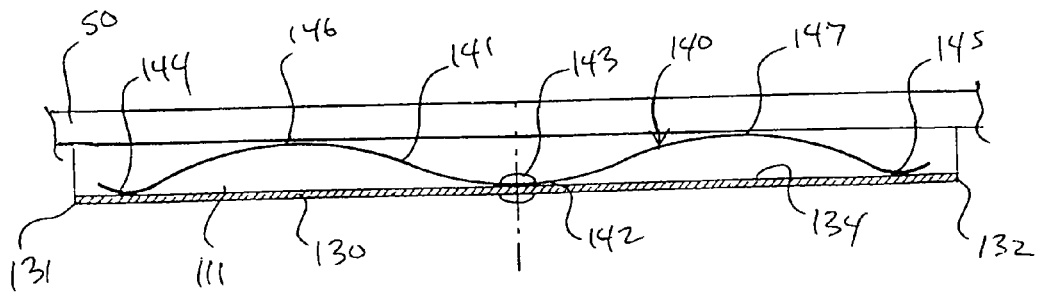
FIG. 5 is a sectional view taken along line 5-5 of FIG. 4.

According to the principle of the invention, a retention member 140 is maintained in socket 134 between body 130 of rod 50, which interacts between body 130 and rod 50 frictionally retaining visor 42 to support 41, in accordance with the principle of the invention. Looking to FIG. 5, retention member 140 is a spring consisting of an elongate spring body 141 formed of a thin strip of spring steel or other suitable material that is both resilient and has shape memory. Spring body 141 is formed with an intermediate portion 142 secured to body 130 with a fastener 143, such as a rivet, screw, pin, or the like. Spring body 141 extends outwardly and upwardly from either side of intermediate portion 142 to opposed raised abutments 146 and 147 and from there downwardly to opposed free ends 144 and 145, respectively, which project downwardly toward and against body 130. The bias of spring body 41 biases free ends 144 and 145 against body 130. Raised abutment 146, which is formed by a length of spring body 141, is located between intermediate portion 142 and free end 144, and raised abutment 147, which is also formed by a length of spring body 141, is located between intermediate portion 142 and free end 145. Being maintained in socket 134 between body 130 of rod 50, raised abutments 146 and 147 frictionally engage/contact and interact with the underside of rod 50 between body 130 and rod 50 frictionally retaining visor 42 to support 41, in accordance with the principle of the invention. Spring body 141 interacts between slider 111 and rod 50 frictionally retaining visor 42 to support 41. The interaction of retention member 140 between slider 111 and rod 50 of support 41 allows visor 42 to be slid across sheet 80 in reciprocal directions between side edges 81 and 82 thereof as indicated by the double arrowed line B in FIGS. 1 and 2, and yet frictionally retains visor 42 in place after it is moved to a desired location relative to support 41, in accordance with the principle of the invention. Although one spring is disclosed for frictionally retaining visor 42 to support 41, more can be used, if desired, and different spring forms may be used to accomplish the same function, if desired.

In use, visor assembly 40 is mounted in field of view A opposing, i.e., in front of, sitting position 31 adjacent to lower edge 25 of windshield 23 and dashboard 27 for suppressing glare from hood 30 in field of view A, as shown in FIG. 1. Glare caused by sunlight reflecting off hood 30 into field of view A can impair the ability of a driver sitting in sitting position 31 to see through windshield 23 and, thus, from safely operating vehicle 20. Glare from sunlight reflecting off the hood of vehicles reflecting into drivers' fields of view is a common cause of traffic accidents. Suppressing glare caused by sunlight reflecting off the hood of a vehicle with visor assembly 40 is clearly useful as it is constructed and arranged to suppress this glare in field of view A from hood 30 of vehicle 20 such that a user sitting in sitting position 31 may operate vehicle 20 safely.

To secure visor assembly 40 in place, visor assembly 40 is located at dashboard 27, is positioned extending laterally across, i.e., substantially perpendicular relative to, field of view A, and the lower ends 60 and 70 of brackets 53 and 54 are affixed to upper surface 27A of dashboard 27 thereby securing visor assembly 40 to dashboard 27. In this immediate embodiment, lower ends 60 and 70 are secured to upper surface 27A of dashboard with screws 150, although adhesive, double-sided tape, rivets, or the like can be used, if desired. Brackets 53 and 54 maintain and support rod 50 above and parallel relative to upper surface 27A of dashboard 27, whereby sheet 80 extends upright therefrom and extends laterally across field of view A, whereby support 41, in turn, supports and maintains visor 42 attached thereto in field of view A, according to the principle of the invention. FIG. 6 is a left side elevational view of visor assembly 40 shown as it would appear installed in conjunction with dashboard 27, and FIG. 7 is a right side elevational view of visor assembly 40 shown as it would appear installed in conjunction with dashboard 27. So installed, major face 85 of sheet 80 of visor assembly 40 faces sitting position 31, and sheet 100 forming part of visor 42 is located rearwardly of sheet 80 across major face 85 toward sitting position 31 or otherwise between sitting position 31 of major face 85 of sheet 80.

To use visor assembly 40 to suppress glare in field of view A, a user sitting in sitting position need only take up visor 42 by hand and slide it across sheet 80 until the glare entering field of view is suppressed from the user's line of sight along field of view A, at which point the user may then release visor 42 and operate vehicle in the normal manner. The provision of retention member 140 (FIGS. 4 and 5) frictionally retains visor 42 in place. To slidably adjust visor 42, a user need only apply sufficient force to overcome the frictional retention of visor 42 to support 41 provided by retention member 140.

Figure 10:
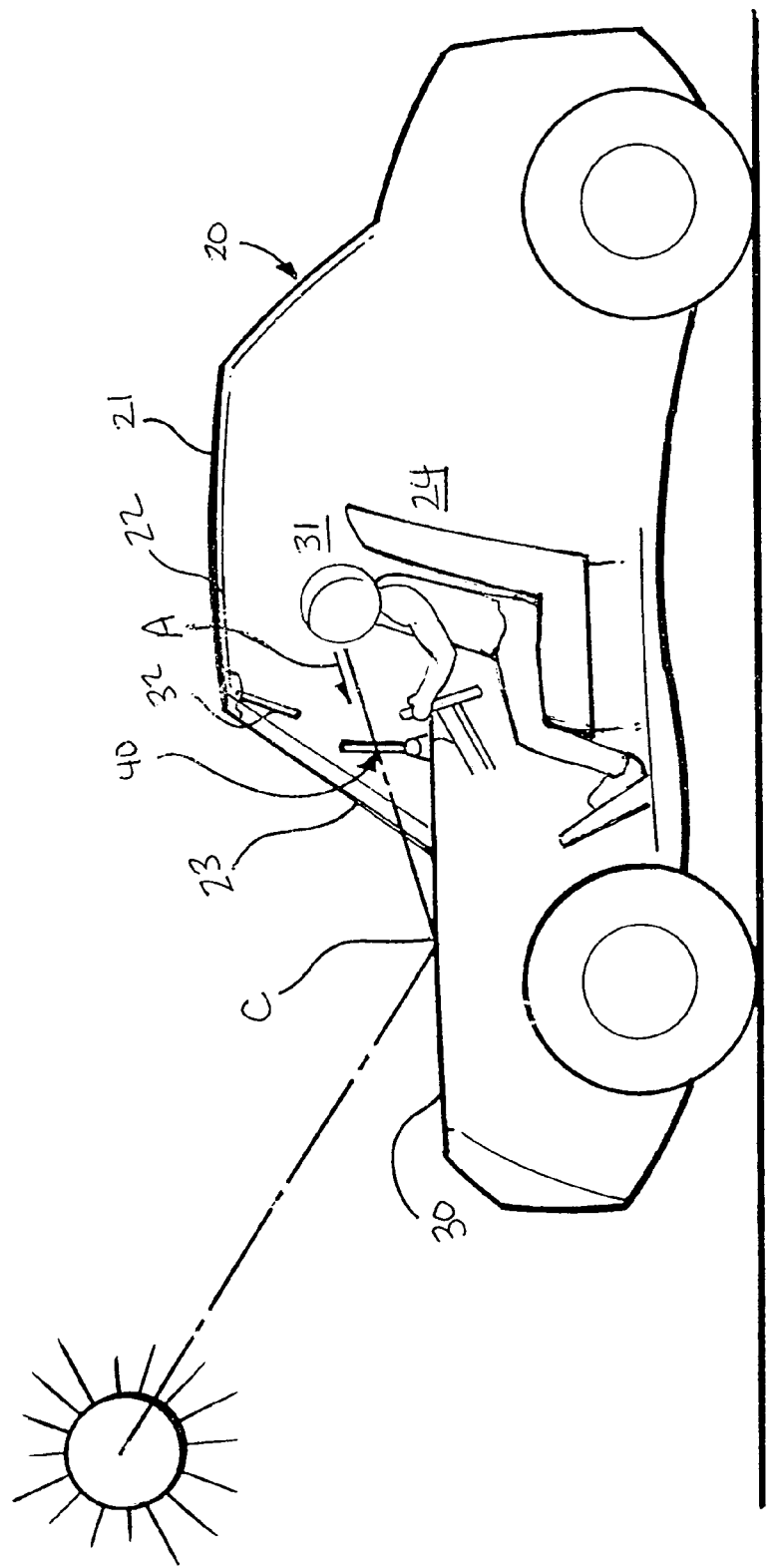
FIG. 10 is schematic view of the vehicle and visor assembly of FIG. 1 shown as it would appear suppressing glare from the hood in the field of view.

In FIG. 1, visor 42 is located along support 41 such that it is suppressing glare in the form of sunlight reflecting off hood 30 at reflection point C in field of view A. As a matter of illustration and reference, FIG. 10 is a schematic representation of visor assembly 40 shown as it would appear installed in conjunction with vehicle 20 suppressing glare in the form of sunlight reflecting off hood 30 at reflection point C in field of view A. Considering FIGS. 1 and 2, sheet 100 of visor 42 is much smaller than sheet 80 of support 41. Sheet 80 is transparent or otherwise fashioned of a high light transmission or high transmission material or combination of materials. Accordingly, portions of sheet 80 not covered by visor 42 can be readily seen through, which maximizes the user's field of view along field of view A while visor 42 is suitably located to suppress glare from field of view A, in accordance with the principle of the invention. If desired, sheet 80 can be constructed of a low-transmission material. If so, and if the glare suppression property of visor 42 is a glare reducing property, it is to be understood that the glare reducing property of visor 42 is greater than whatever glare reducing property sheet 80 may possess.

The ability of a user sitting in sitting position 31 to slide visor 42 across support 41 in reciprocal directions as indicated by the double arrowed line B in FIGS. 1 and 2 across field of view A allows a user to adjust visor 42 across field of view A for locating visor 42 where needed to suppress the glare from hood 30 in field of view A as the direction of the glare in field of view A changes or otherwise as the reflection point on the hood of the vehicle changes or moves, in accordance with the principle of the invention, either with the movement of the sun, the movement of the vehicle, or both. In particular, while driving the driver, at one time or another, will steer the vehicle slightly from one direction or another but still in the general direction of the sun and reposition the reflection of the light from the sun on the hood. When this occurs, the driver may simply move visor 42 as needed in order to suppress the glare from the new reflection point on the hood.

Furthermore, the ability to pivot rod 50 relative to brackets 53 and 54 allows a user to pivot rod 50 as needed for pivoting support 41 in pivotal directions as generally indicated by the arcuate arrowed line D in FIGS. 6 and 7 and thus visor 42 support 41 carries between a first or rearward position denoted generally at 160 away from windshield 23 toward sitting position 31 and a second or forward position denoted generally at 161 toward windshield 23 away from sitting position 31, thereby providing adjustment of visor 42 relative to field of view A for locating visor 42 where needed to suppress the glare from hood 30 in the field of view A as the angle of the glare in field of view A changes, i.e., becomes steeper or shallower, in accordance with the principle of the invention. To pivot support 41, a user need only apply sufficient force to support 41, such as at knob 67 or elsewhere along support 41, to overcome the frictional retention of rod 50 to bracket 53 with knob 67 and washer 68 tightened thereagainst, in which the frictional retention of rod 50 to bracket 53 with knob 67 and washer 68 is sufficient to hold support 41 and visor 42 in whatever position support 41 is located. Pivoting support 41 is also desirable because it allows the orientation of visor 42 to be adjusted for accommodating driver's of different heights, namely, for allowing a user to orient visor 42 according to the user's visual point of reference relative to field of view A. Moreover, visor assembly 40 may simply be pivoted out of field of view A, either toward windshield 23 or toward steering wheel 30 (FIG. 1), during periods of non-use or when use of visor assembly 40 is no longer needed, such as at night or in low light conditions. As previously explained, knob 67 can simply be loosened for allowing a user to pivot support 41, and then retightened for locking support 41 in place to an adjusted position.

The rearward and forward positions designated generally at 160 and 161 are set forth only for illustrative purposes, are intended only to denote general positioning, and are not intended to denote the exact positions of the rearward and forward positions of visor assembly 40. Furthermore, the proximity of visor assembly 40 relative to windshield 23 in FIGS. 6 and 7 is exaggerated toward visor assembly 40 as illustrated in FIGS. 6 and 7 for illustrative purposes and for orientation and reference.

Those having regard for the art will readily appreciate that a highly useful visor assembly 40 for suppressing glare from hood 30 of vehicle 20 in field of view A is disclosed. The invention can be used not only with passenger vehicles, such as cars, trucks, buses, and other similar vehicles, but also with boats, planes, and other vehicle forms whereby glare reflecting off a hood into a user's field of view is a problem to be solved. Visor assembly 40 is simple and inexpensive to construct, easy to install, and increases a user's ability to safely operate a vehicle by reducing glare reflecting into the user's field of view from the hood of the vehicle.

The invention has been described above with reference to a preferred embodiment. However, those skilled in the art will recognize that changes and modifications may be made to the embodiment without departing from the nature and scope of the invention. For instance, although sheet 100 of visor 42 opposes major face 85 of sheet 80, it can be similar mounted to oppose major face 86 of sheet 80 without departing from the invention. Also, although sheet 80 of transparent material of support 41 is rectangular in shape and sheet 100 of visor 42 is square in shape, these shapes are disclosed as a matter of example in conjunction with a preferred embodiment, and it is to be understood that other selected shapes can be used consist with the function accomplished by visor apparatus 40 as dictated by the structure herein disclosed. Furthermore, although in the preferred embodiment support 41 of visor assembly 40 is affixed to dashboard 27 for supporting visor 42 in field of view A, support 41 can be mounted in place in other ways so as to locate visor 42 in field of view A. To illustrate this point, FIGS. 11 and 12 set forth an alternate embodiment of a visor assembly denoted generally at 170.

Visor assembly 170 is constructed and arranged in accordance with the principle of the invention, and in common with the previously-described embodiment designated at 40 shares support 41 and visor 42, and, save for one difference, namely, the way support 41 is mounted in place, is identical in every respect to visor assembly 40, in which case the foregoing discussion of visor assembly 40 applies to visor assembly 170 in every respect. Rather than mounting support visor 42 in field of view A by attaching support 41 to dashboard 27 as with visor assembly 40, visor 42 of visor assembly 170 is mounted is mounted in field of view A by securing support 41 to windshield 23 with armatures 171 and 172, in which armature 171 is depicted in FIG. 11 and armature 172 is depicted in FIG. 12.

Referring to FIG. 11, armature 171 consists of a base 173 affixed to inner surface 23A of windshield 23 facing interior 24, and a coupling 174 affixed to lower end 60 of bracket 53. Base 173 supports an arm 175, which extends outwardly therefrom to a ball 176 held in a socket 177 formed in coupling 174. Looking to FIG. 12, armature 172 consists of a base 183 affixed to inner surface 23A of windshield 23 facing interior 24, and a coupling 184 affixed to lower end 70 of bracket 54. Base 183 supports an arm 185, which extends outwardly therefrom to a ball 186 held in a socket 187 formed in coupling 184. Armatures 171 and 172 are identical in every respect. Armatures 171 and 172 couple support 41 to windshield 23, and together maintain or otherwise carry support 41, and thus visor 42, in field of view A as discussed previously in conjunction with visor assembly 40. Arms 175 and 185 each have a length suitable for supporting support 41, and thus visor 42, in field of view A as discussed previously in conjunction with visor assembly 40.

Ball 176 and socket 177 of armature 171, and ball 186 and socket 187 of armature 172, are each exemplary of a well-known ball-and-socket articulating joint, in which these ball-and-socket joints permit the pivoting of support 41, and thus visor 42, along arcuate arrowed line B as discussed previously in conjunction with visor assembly 40. Although armatures 171 and 172 utilize ball-and-socket joints for providing the described pivotal adjustment, other suitable articulating or pivot joints can be used. Moreover, support 41 is pivotally adjustable relative to brackets 53 and 54 in conjunction with visor assembly 170 in the same manner as described in conjunction with visor assembly 40 for providing the pivotal adjustment of support 41, and thus visor 42, of visor assembly 170 as needed.

The rearward and forward positions of visor assembly 170 designated generally at 160 and 161 in FIGS. 11 and 12 are, as with FIGS. 6 and 7, set forth only for illustrative purposes, are intended only to denote general positioning, and are not intended to denote the exact positions of the rearward and forward positions of visor assembly 170. Furthermore, the proximity of visor assembly 170 relative to windshield 23 in FIGS. 11 and 12 is exaggerated toward visor assembly 170 for illustrative purposes and for orientation and reference.

Various visor forms can be used in conjunction with the preferred embodiments set forth herein without departing from the invention, and different ways of mounting a visor to support 41 allowing the reciprocal adjustment of the visor relative to support 41 may be utilized without departing from the invention. As a matter of example, FIGS. 12-15 illustrate an alternate embodiment of a visor 190 that may be used in conjunction with a visor assembly constructed and arranged in accordance with the principle of the invention. Looking to FIG. 12, visor 190 consists of a sheet 200 of material including opposed, upstanding, parallel side edges 201 and 202, opposed, longitudinal, parallel upper and lower edges 203 and 204, and opposed major faces 205 and 206. Side edges 201 and 202 and upper and lower edges 203 and 204 cooperate together forming a perimeter edge of sheet 200. Sheet 200 is square in shape having a length extending from side edge 201 to side edge 202, and a height extending from upper edge 203 to lower edge 204, in which the length of sheet 200 is substantially equal to the height of sheet 200. The length of sheet 100 is substantially smaller than the length of sheet 80 of support 41, referenced in FIG. 14, and in the preferred embodiment set forth herein is only about approximately 25% of the length of sheet 80 as with sheet 100 previously discussed. As with sheet 100, sheet 200 can be somewhat less than 25% of the length of sheet 80 or somewhat greater than 25% of the length of sheet 80. Sheet 200 is constructed and arranged to suppress glare from hood 30 in field of view A, as previously explained in conjunction with visor assembly 40. In the instant embodiment, sheet 200 is fashioned of fabric, cotton, canvass, vinyl, polyester or other like fabric or fabric-like material capable of suppressing glare, although it can be constructed like that of sheet 100, if desired.

Secured to the major face 206 of sheet 200 proximate side edges 201 and 202 are straps 210 and 211, respectively. Straps 210 and 211 are equal in length, are parallel relative to each other, are secured to major face 206 and are identical in structure. In the present embodiment, sheet 200 is fashioned of a flexible, pliant, material capable of suppressing glare as are straps 210 and 211. Because straps 210 and 211 are identical in structure, only the details of strap 210 will be discussed with the understanding that the ensuing discussion of strap 210 applies in every respect to strap 211.

Strap 210 has an intermediate section 220, and opposed free ends 221 and 222. Intermediate section 220 is secured to major face 206 with stitching substantially from upper edge 203 to lower edge 204. Free end 221 extends away from upper edge 203, and free end 222 extends away from lower edge 204. Free ends 221 and 222 support an engagement pair including an element 224 thereof carried by free end 221 and a complemental element 225 thereof carried by free end 222, and that when engaged together detachably secure free end 221 to free end 222. In the immediate embodiment, the engagement pair consists of a hook-and-loop engagement pair, in which case element 224 is the loop component of the hook-and-loop fastener, and complemental element 225 is the corresponding hook component of the hook-and-loop fastener, although this arrangement can be reversed. Other suitable engagement pairs may be used between free ends 221 and 222, such as mutual snap fasteners, button fasteners, etc.

To install visor 190 in conjunction with support 41 as illustrated in FIGS. 14 and 15, visor 190 is taken up and positioned major face 106 first against major face 85 of sheet 80 locating upper edge 203 proximate upper edge 83 of sheet 80 and lower edge 204 proximate rod 50. Straps 210 and 211 are wrapped over upper edge 83 of sheet 80 and rod 50, and their respective free ends 221 and 222 are brought together alongside major face 86 of sheet 80 and secured together with the corresponding elements and complemental elements of the engagement pairs they carry, thereby securing sheet 200 in place. FIG. 15 illustrates strap 211 wrapped over upper edge 83 of sheet 80 and rod 50, and its free ends 221 and 222 brought together alongside major face 86 of sheet 80 and secured together with the corresponding element 224 and complemental element 225 of the engagement pair it carries. So installed in conjunction with support 41 in the manner herein described, the function of visor 190 of suppressing glare in field of view A is identical in every respect to visor 42 discussed in conjunction with visor assembly 40. Visor 190 can be simply slide across support 41 in reciprocal directions as indicated by arrowed line B in FIG. 14, thereby providing adjustment of visor 190 across the field of view for locating visor 190 where needed to suppress the glare from the field of view as the direction of the glare in the field of view changes.

If desired, straps 210 and 211 can be attached to major face 205 of sheet 200. Furthermore, straps 210 and 211, and sheet 200 may be integrally fashioned, if desired. Moreover, although visor 190 is installed locating sheet 200 opposite major face 85 of sheet 80 of support 80, it can be similar installed opposing major face 86 without departing from the invention.

Various further changes and modifications to the embodiments herein chosen for purposes of illustration will readily occur to those skilled in the art. For instance, a visor assembly constructed and arranged in accordance with the principle of the invention can be mounted in any suitable way to a vehicle for locating the visor assembly in field of view A adjacent to lower edge 25 of windshield 23 and dashboard 27 for suppressing glare from hood 30 reflecting upwardly therefrom in field of view A, which may otherwise impair a driver in sitting position 31 from safely operating vehicle 20. Accordingly, the present disclosure explains how a visor assembly constructed and arranged in accordance with the principle of the invention may be mounted to the dashboard or to the windshield of a vehicle, it can be mounted elsewhere consistent with this disclosure so as to support the visor assembly in the field of view for allowing the visor assembly to suppress glare from the hood reflecting upwardly into the field of view as herein specifically disclosed. In sum, to the extent that such modifications and variations do not depart from the spirit of the invention, they are intended to be included within the scope thereof.

Having fully described the invention in such clear and concise terms as to enable those skilled in the art to understand and practice the same, the invention claimed is:

1. In a vehicle including a cab, having a windshield with opposed upper and lower edges, bounding an interior, a dashboard extending into the interior proximate the lower edge of the windshield, a hood extending forwardly of the cab proximate the lower edge of the windshield, a sitting position in the interior of the vehicle rearward of the dashboard, and a field of view to the hood through the windshield overlying the dashboard from the sitting position, improvements therein comprising:
   a support, including an elongate, upstanding sheet of transparent material, disposed in the interior of the cab, the sheet of transparent material disposed in, and extending across, the field of view adjacent to the lower edge of the windshield and the dashboard and having opposed upper and lower edges, opposed side edges, and opposed first and second major faces;
   a visor, having a suppressing property, coupled to the support, the visor disposed between the opposed side edges of the sheet of transparent material overlying and extending across the first major face substantially from the lower edge thereof to the upper edge thereof; and
   the visor disposed in the field of view adjacent to the lower edge of the windshield and the dashboard for suppressing glare from the hood in the field of view.

2. The improvements according to claim 1, wherein the visor is further mounted to the support for movement in reciprocal directions relative to the sheet of transparent material between a first position adjacent to the first side edge of the sheet of transparent material and a second position adjacent to the second side edge of the sheet of transparent material.

3. The improvements according to claim 1, wherein the support is further mounted for movement in pivotal directions between a first position disposing the visor away from the windshield toward the sitting position and a second position disposing the visor toward windshield away from the sitting position.

4. The improvements according to claim 1, wherein the support is mounted to the dashboard.

5. The improvements according to claim 1, wherein the support is mounted to the windshield.

6. The improvements according to claim 1, further comprising a retention member interacting between the visor and the support frictionally retaining the visor to the support.

7. The improvements according to claim 6, wherein the retention member comprises a spring captured by, and interacting between, the visor and the support.

8. The improvements according to claim 1, wherein the suppressing property of the visor comprises a glare reducing property.

9. The improvements according to claim 1, wherein the suppressing property of the visor comprises a glare blocking property.

* * * * *